UNITED STATES PATENT OFFICE.

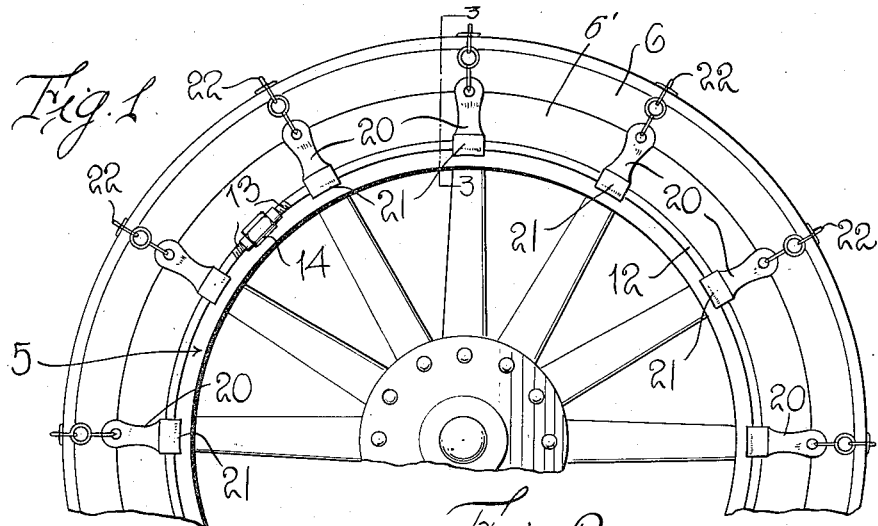
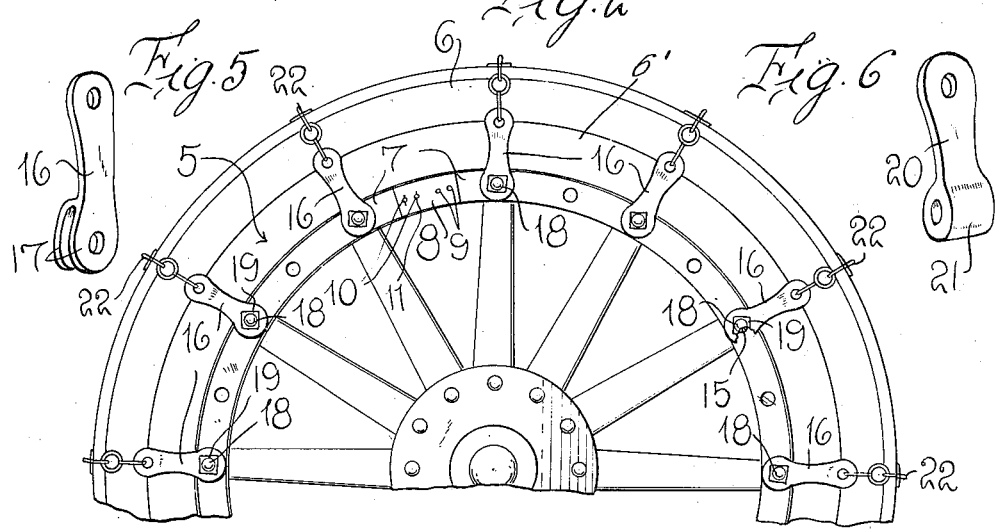
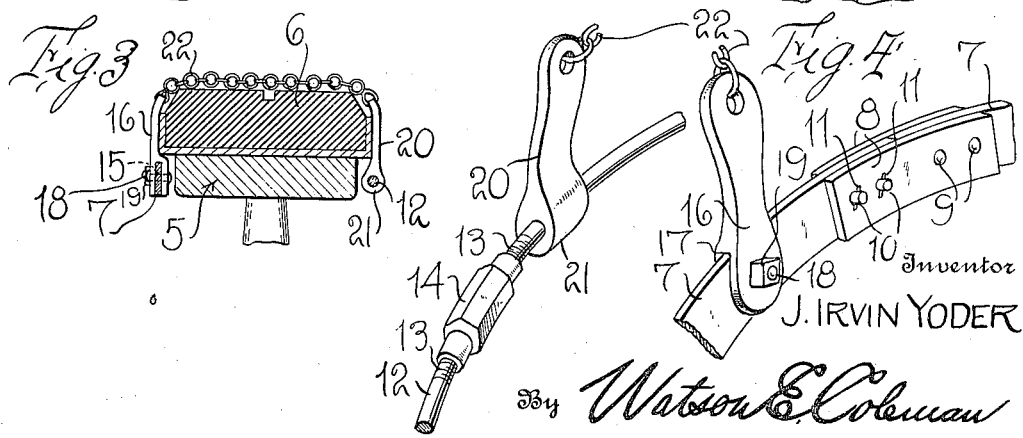

JOHN IRVIN YODER, OF ASHLAND, PENNSYLVANIA.

ANTISKIDDING DEVICE FOR MOTOR-VEHICLE WHEELS.

1,257,170.

Specification of Letters Patent. Patented Feb. 19, 1918.

Application filed November 8, 1916. Serial No. 130,226.

*To all whom it may concern:*

Be it known that I, JOHN IRVIN YODER, a citizen of the United States, residing at Ashland, in the county of Schuylkill and State of Pennsylvania, have invented certain new and useful Improvements in Antiskidding Devices for Motor-Vehicle Wheels, of which the following is a specification, reference being had to the accompanying drawings.

This invention relates to an improved anti-skidding device for motor vehicle wheels and has for its primary object to provide a device of the chain tread type which is so constructed that the transverse chains may readily move or shift upon the tread of the wheel tire so that the tire will be evenly worn by said chains.

It is another important object of the invention to provide simple and effective means for retaining the transverse tread chains in place and reducing to a minimum the possibility of the breakage of said chains.

It is also one of the more particular objects of the invention to devise improved fastening or retaining means for the chains, which is so constructed as to admit of the easy and quick removal of any one or more of the chains or the adjustment of the same circumferentially of the wheel tire, and to also provide easily actuated means for tightening the transverse chains upon the periphery of the tire.

It is a further object of the invention to generally improve and simplify the construction of anti-skidding devices of the above type, whereby the same are rendered highly efficient and serviceable in practical use, strong and durable in construction, and capable of manufacture at relatively small cost.

With the above and other objects in view, my invention consists in the novel features of construction, combination and arrangement of parts to be hereinafter more fully described, claimed and illustrated in the accompanying drawing, in which, Figure 1 is a partial outer side elevation of a wheel having my improved anti-skidding means applied thereto;

Fig. 2 is a similar view looking at the inner face of the wheel;

Fig. 3 is an enlarged transverse section taken on the line 2—2 of Fig. 1;

Fig. 4 is an enlarged fragmentary perspective view of the device; and

Figs. 5 and 6 are detail perspective views of the chain attaching arms.

Referring in detail to the drawing, 5 designates a motor vehicle wheel which is equipped in any usual or approved manner with a suitable tire 6. This tire may either be of solid rubber construction or of the inflatable pneumatic type.

My invention, in its preferred form, includes a flat, metal ring made up of two sections indicated at 7. These sections are rigidly connected to each other at one of their ends by means of plates 8 engaged upon the opposite side faces of the ring sections and securely riveted to one of said ring sections, as at 9. The plates 8 are loosely connected to the opposed end of the other ring section by the spaced pins indicated at 10 inserted through coinciding openings and plates and detachably held therein by cotter pins 11 or equivalent means. The ring or annulus thus formed is adapted to be arranged upon the inner side of the vehicle wheel.

A second ring or annulus is adapted to be arranged upon the outer side of the vehicle wheel and this ring also consists of two semi-circular sections 12, each of which consists of a rod, and the opposed ends of said ring sections are threaded in relatively opposite directions as at 13. The ring sections are connected by the turn buckles 14, the bores of which are provided with right and left hand threads in their opposite ends to receive the correspondingly threaded ends of the ring sections 12.

Each of the flat, metal ring sections 17 is provided with a plurality of equidistantly spaced openings 15, and upon these ring sections the bifurcated ends 17 of the longitudinally curved arms 16 are adapted to be engaged. The spaced portions of the bifurcations 17 are perforated to coincide with one of the openings 15 in the metal ring and loosely receive a bolt 18 upon the outer end of which a retaining nut 19 is threaded. A similar series of curved arms 20 are engaged upon the other ring sections 12, each of the latter arms having a sleeve 21 formed upon one of its ends loosely engaged upon said ring. The arms 16 and 20 are longitudinally curved to extend inwardly over the outer faces of the side flanges on the tire holding rim 6', and the portions 17 and 21 of these arms extend inwardly from said flanges on opposite sides of the wheel felly, as clearly shown in Fig. 3 of the drawing. The outer ends of the arms 16 and 20 are perforated to receive the terminal links of the tire chains 22 which extend transversely across the periphery of the tire 6. In the large majority of cases, these chains upon anti-skidding devices as now constructed, break because of their wearing contact upon the side flanges of the wheel rim, and it is to be particularly observed that, in the present invention, no portion of these chains engages any metallic part, but they are wholly disposed upon the rubber tire.

From the foregoing description, taken in connection with the accompanying drawing, the construction, manner of operation and several advantages of the invention will be clearly and fully understood. The several parts of the invention may be easily and quickly assembled and arranged in proper relation to the wheel. As the arms 20 are slidably engaged upon the ring sections 12, they may readily shift thereon so that the transverse tread chains will move upon the periphery of the tire and not wear at all times in one place. The said chains may also be tightened to exert greater or less pressure upon the periphery of the tire by the proper adjustment of the turn buckles 14 connecting the ring sections 12. Any one or more of the chains may also be readily replaced or removed by simply removing the bolts 18 and detaching the inner arms 20. It is also to be observed that in case one or more of these transverse chains break, it will not in any way affect the tension of the other chains upon the periphery of the tire or destroy their continued effectiveness in the operation of the device. It will also be manifest that the invention is extremely durable and, in view of the simple form and construction of the several elements, any part thereof may be readily replaced at nominal cost.

While I have shown and described the preferred construction and arrangement of the several elements, it is to be understood that I reserve the privilege of adopting all such legitimate changes as may be fairly embodied within the spirit and scope of the invention as claimed.

Having thus fully described my invention, what I desire to claim and secure by Letters Patent is:—

An anti-skidding device for wheel tires including metal rings adapted to be arranged upon opposite sides of a wheel felly, a series of spaced arms detachably secured upon one of the rings and held against relative shifting movement, a series of spaced arms mounted on the other ring for free circumferential movement thereon with respect to each other, all of said arms projecting outwardly beyond the tire rim, and transverse tread chains connecting the outer extremities of corresponding arms on opposite sides of the wheel.

In testimony whereof I hereunto affix my signature in the presence of two witnesses.

JOHN IRVIN YODER.

Witnesses:
WALTER G. FREIBLY,
FRANK J. KODADEK.